June 30, 1964 G. L. CLARK ETAL 3,139,588

VARIABLE TIME DELAY GENERATOR UTILIZING SWITCH MEANS AND PLURAL RESONATING ELEMENTS

Filed Feb. 20, 1962 2 Sheets-Sheet 1

GEORGE L. CLARK
JOHN J. HICKEY
INVENTORS

BY Jerry A. Dinardo
George C. Thompson
AGENTS

June 30, 1964 G. L. CLARK ETAL 3,139,588
VARIABLE TIME DELAY GENERATOR UTILIZING SWITCH MEANS AND PLURAL RESONATING ELEMENTS
Filed Feb. 20, 1962 2 Sheets-Sheet 2

GEORGE L. CLARK
JOHN J. HICKEY
INVENTORS

BY Jerry A. Dinardo
George C. Thompson
AGENTS

United States Patent Office 3,139,588

Patented June 30, 1964

3,139,588

VARIABLE TIME DELAY GENERATOR UTILIZING SWITCH MEANS AND PLURAL RESONATING ELEMENTS

George L. Clark and John J. Hickey, Hawthorne, Calif., assignors to Space Technology Laboratories, Inc., Los Angeles, Calif., a corporation of Delaware Filed Feb. 20, 1962, Ser. No. 174,505
3 Claims. (Cl. 328—177)

This invention relates generally to time delay generating circuits and particularly to timing waveform improvements in electronic time delay generators capable of providing precisely timed delays that are variable over a wide range.

It is often desired to make use of timing circuits in which a timing waveform is initiated only after a precise interval following the occurrence of a given event. When such circuits are used in ultra high speed photography, it is necessary that the time jitter or variation in time delay be maintained at a minimum in order to insure correct timing of exposures. The time jitter of any electronic time delay generator is determined largely by the shape of the timing waveform that is generated. A slowly rising timing waveform produces more jitter than a rapidly rising waveform. Furthermore, longer time delays are usually accompanied by slower rising timing waveforms and larger jitter times. One of the difficulties encountered in attempting to provide variable time delays is that for the longer delays, the size required of individual circuit components and the number of different sized components required become unduly large.

Accordingly, it is a principal object of this invention to reduce the rise time and decrease the time jitter of a timing waveform.

A further object is to provide an easily variable time delay circuit capable of generating a timing waveform which rises as fast for long time delays as for short time delays.

Yet another object is the provision of a circuit which is capable of producing timing waveforms having precisely timed delays that are variable over a wide range, the circuit being characterized by its compact, uniformly sized components.

The foregoing and other objects are realized in a time delay generating apparatus of the kind employing an oscillatory circuit to generate a delayed waveform. The oscillatory circuit has two different frequency modes of operation. During the first half cycle of operation, the circuit oscillates at a frequency, determined by selected circuit parameters, that corresponds to the desired delay time. At the termination of the first half cycle, some of the circuit parameters are changed automatically to cause oscillation at a much higher frequency and amplitude. The first half cycle of the second frequency mode thus produces a fast rising waveform, which is used as the timing pulse.

The oscillatory circuit includes a plurality of inductors and capacitors which are selectively connected together through switching means to make the circuit oscillate at any one of a number of predetermined frequencies corresponding to the desired delay. By connecting the different inductors and capacitors individually and collectively together, waveforms covering a wide range of different delay times are generated through the use of uniformly sized components. Furthermore, in a preferred arrangement, the different components are connected in such a way that as the delay time is increased, the jitter time does not increase.

Figure 1:
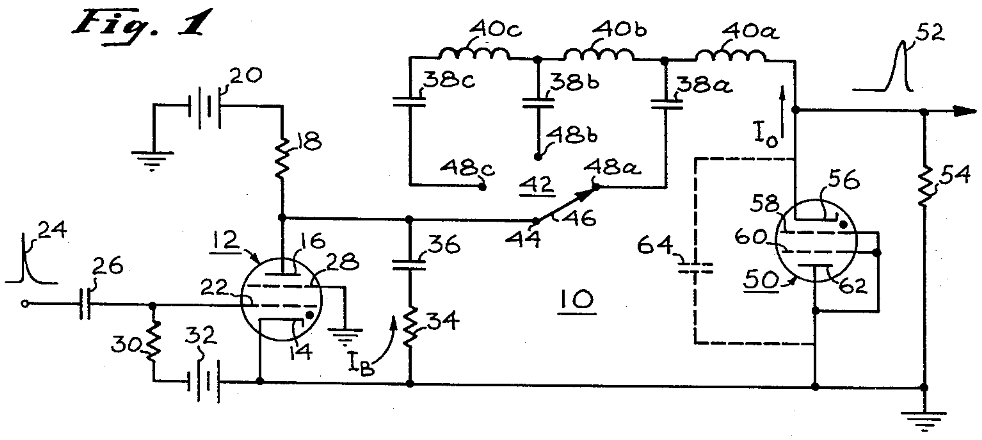
FIG. 1 is a schematic diagram of one form of delay pulse generator according to the invention.

Referring to FIG. 1, which is a schematic diagram of one embodiment of the invention, a delay pulse generator 10 includes a switching device 12, such as a thyratron gas discharge tube. The switching device 12 has its cathode 14 at ground reference potential and its anode 16 maintained at a suitable positive potential by connection through a charging resistor 18 to a direct current voltage source 20. Other electrode elements of the switching device 12 include a trigger or control electrode 22 for reception of a positive trigger pulse 24 through a coupling capacitor 26, and a shield electrode 28, which is maintained at cathode or ground potential. The control electrode 22 is maintained at a high negative potential by connection through a grid resistor 30 to a negative bias source 32. The bias source 32 is sufficient in magnitude to maintain the switching device 12 normally nonconducting.

The switching device 12 may comprise a type 5696 miniature thyratron, for example. When the tube elements are so connected, the switching device 12 can be switched to a fully conducting condition in about 10 nanoseconds (1 nanosecond$=1\times10^{-9}$ seconds) after the application of the trigger pulse 24 to the control electrode 22.

A current bias circuit includes a resistor 34 and a capacitor 36 serially connected between the cathode 14 and the anode 16.

Timing waveforms having different delay times are generated by selectively connecting one or more of each of a plurality of capacitors 38*a*, 38*b*, 38*c* and inductors 40*a*, 40*b*, 40*c* in an oscillatory circuit. Selection of the particular combination of capacitors 38*a*–38*c* and inductors 40*a*–40*c* is made through a switch 42 having a common terminal 44 and a movable arm 46 connectable to either one of a plurality of terminals, three of which are shown and labeled 48*a*, 48*b*, and 48*c*.

In the particular switch position shown, with the arm 46 of the switch 42 connected to terminal 48*a*, the oscillatory circuit includes the switching device 12, one capacitor 38*a*, one inductor 40*a*, and a unidirectional current conducting device or diode 50 connected in series to produce a timing waveform 52 having a given period of delay. As will be explained more fully below, a longer period of delay is produced by moving the arm 46 of the switch 42 to terminal 48*b* to connect capacitor 38*b* in series with two inductors 40*b* and 40*a*. A still longer period of delay is produced by moving the arm 46 of the switch 42 to terminal 48*c* to connect capacitor 38*c* in series with three inductors 40*c*, 40*b*, and 40*a*. Each of inductors 40*a*–40*c* preferably are of equal inductance value, whereas the capacitance of capacitor 38*b* is some multiple of the capacitance of capacitor 38*a*, and capacitor 38*c* is a higher multiple thereof. For example, capacitor 38*b* has twice the capacitance value of capacitor 38*a*, and capacitor 38*c* has three times the capacitance value of capacitor 38*a*. Thus, when the switch arm 46 is moved from terminal 48*a* to terminals 48*b* and 48*c* both the capacitance and the inductance of the series oscillatory circuit are progressively increased so as to decrease the resonant or oscillating frequency and thereby increase the delay time, as will be explained.

A D.C. return resistor 54 is connected across the diode 50. The diode 50 is arranged to conduct current flowing in a direction from the cathode 14 of the switching device 12, through the diode 50, inductor 40*a*, capacitor 38*a*, switch 42, to the anode 16 of the switching device 12, and to block current flowing in the opposite direction.

The diode 50 is preferably a thyratron tube, such as a type 5696, with its cathode 56 connected to the inductor 40*a*. The grid 58, shield electrode 60, and anode 62 of the diode 50 are connected together and to ground. The advantages of using a thyratron for the diode 50 are its extremely short reverse recovery time, its ability to conduct high currents in the forward direction, its ability to withstand high voltages in the reverse direction, and its low resistance in the resonant circuit.

In the switch position shown, the time delay generator 10 thus includes a series charging circuit composed of the voltage source 20, plate resistor 18, switch 42, capacitor 38*a*, inductor 40*a*, and D.C. return resistor 54, when the switching device 12 is nonconducting. When the switching device 12 conducts, it forms a path for a discharge circuit which includes, besides the switching device 12, the capacitor 38*a*, inductor 40*a*, and diode 50.

The operation of the time delay generator 10 will now be described with the arm 46 of the switch 42 connected to terminal 48*a* as shown. In this switch position, the capacitor 38*a* and inductor 40*a* are individually connected together. In the absence of a trigger pulse 24 on the control electrode 22 of the switching device 12, the latter assumes a nonconducting condition. The capacitor 38*a* charges up to the full voltage of the source 20, through one charging circuit including the source 20, charging resistor 18, switch 42, capacitor 38*a*, inductor 40*a*, and D.C. return resistor 54. Similarly, current bias capacitor 36 charges up to the full voltage of the source 20 through another charging circuit including the source 20, charging resistor 18, capacitor 36, and resistor 34.

When a trigger pulse 24 is applied to the control electrode 22 of the switching device 12 through the coupling capacitor 26, the device 12 is fired to a conducting condition, thereby providing a low resistance path between the cathode 14 and the anode 16. The appearance of the low resistance path enables the current bias capacitor 36 to discharge through the path including the device 12 and resistor 34. Assuming conventional current flow, the direction of flow of this current, which will be termed the bias current $I_B$, is from the bias capacitor 36 to the anode 16, through the switching device 12 to the cathode 14, through the bias resistor 34 and back to the current bias capacitor 36. In addition, the conducting condition of the switching device 12 enables the capacitor 38*a* to discharge through a second path including the switching device 12, diode 50, inductor 40*a* and switch 42. The presence of the inductor 40*a* in the second path gives rise to an oscillatory current $I_0$, whose initial direction of flow is in the low impedance or current conduction direction of the diode 50, that is, from the anode 62 to the cathode 56. The path of the oscillatory current $I_0$ is from the capacitor 38*a*, through the switch 42, to the anode 16 of the switching device 12, to the cathode 14, to the anode 62 of the diode 50, to the cathode 56, through the inductor 40*a* and back to the capacitor 38*a*.

Figure 2:
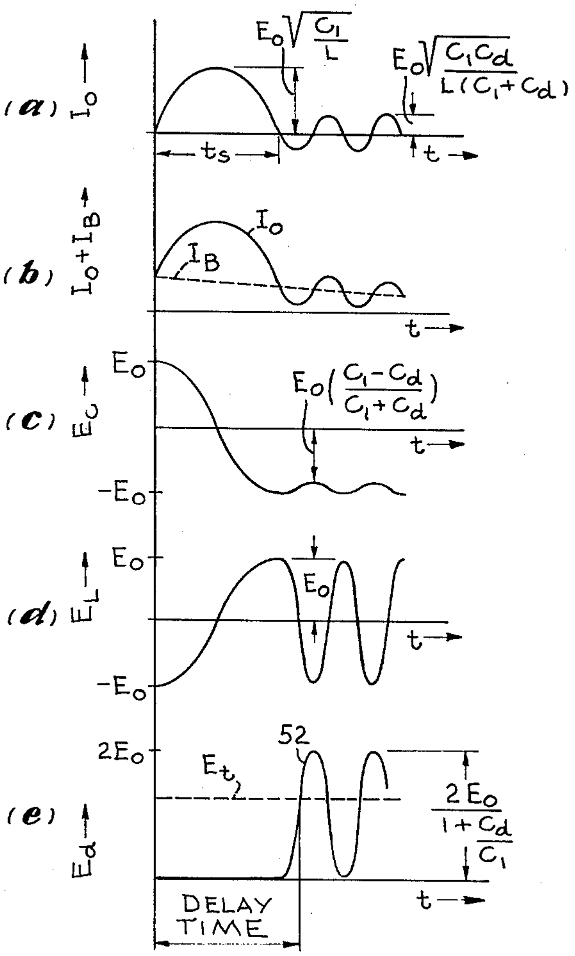
FIG. 2 is a series of graphs of waveforms useful in explaining the operation of the delay pulse generator of FIG. 1.
Figure 5:
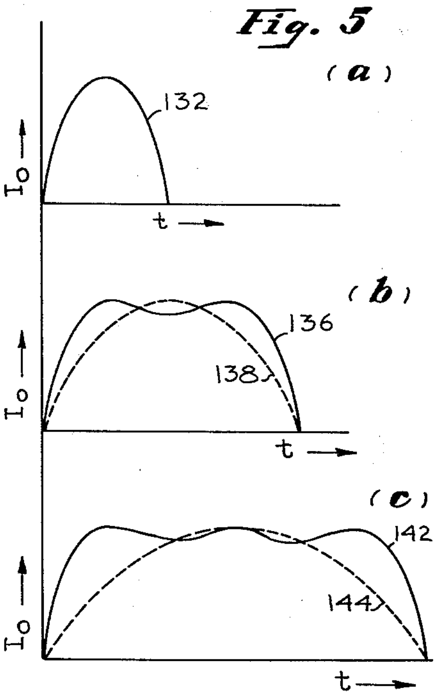
FIG. 5 is a series of graphs of waveforms useful in explaining the operation of the delay pulse generator of FIG. 4.

Reference is now made to the graphs of FIG. 2 which depict the current and voltage waveforms associated with the various circuit elements. Graph 2(*a*) illustrates the oscillatory current $I_0$ flowing in the circuit. Graph 2(*b*) illustrates the composite bias and oscillatory currents $I_B$ and $I_0$, respectively, flowing in the switching device 12. Graph 2(*c*) illustrates the voltage $E_c$ across the capacitor 38*a*. Graph 2(*d*) illustrates the voltage $E_l$ across the inductor 40*a*. Graph 2(*e*) illustrates the output voltage $E_d$ across the diode 50.

It is seen in graph 2(*a*) that during the first half cycle of current flow, the oscillatory current $I_0$ varies at a sinusoidal rate that is determined by the circuit parameters, namely, the inductance of the inductor 40*a* and the capacitance of capacitor 38*a*. The current $I_0$ can be expressed by the following equation, $$I_O(t)=\frac{E_O}{\omega_1 L}\sin \omega_1 t$$

where $E_0$ is the voltage of the source 20, L is the inductance of inductor 40*a*, and $$\omega_1=\frac{1}{\sqrt{LC_1}}$$

where $C_1$ is the capacitance of capacitor 38*a* and $\omega_1$ is the angular frequency in radians per second.

As shown in graphs 2(*c*) and 2(*d*), the maximum values of the voltages $E_c$ and $E_L$ across the capacitor 38*a* and inductor 40*a*, respectively, are equal to the source voltage $E_0$, and the voltages $E_c$ and $E_L$ are at all times equal and opposite to each other. Since the diode 50 is conducting, it acts as a short circuit, and hence no voltage is developed thereacross, as shown in graph 2(*e*).

It is noted in graph 2(*b*) that the current through the switching device 12 has two components, namely the oscillatory current $I_0$ and the bias current $I_B$. The bias current $I_B$ has a long time constant and is of sufficient magnitude to maintain the switching device 12 conducting when the oscillatory current $I_0$ reverses direction. Since the switching device 12 can conduct current only in one direction, it can not conduct the oscillatory current $I_0$ by itself during a negative excursion, but will conduct such current when it is superimposed on a greater positive current, such as the bias current $I_B$.

At the end of the first half cycle of oscillation, the capacitor 38*a* is fully charged with a polarity opposite to its original polarity, as shown in graph 2(*c*), and has a tendency to reverse the direction of the oscillatory current $I_0$. Since the diode 50 will not conduct current in the reverse direction, it presents a high reactive impedance, in the form of a small diode capacitance 64, shown in phantom in FIG. 1. The circuit parameters now are composed of capacitor 38*a*, inductor 40*a*, and the diode capacitance 64, which preferably has a very small magnitude as compared with capacitor 38*a*. Since the diode capacitance 64 is much smaller than that of capacitor 38*a*, the frequency of oscillation will now be controlled primarily by the diode capacitance 64. Accordingly, the frequency will increase to a value $\omega_2$ determined by the following expression, $$\omega_2=\frac{1}{\sqrt{L\left(\frac{C_1\times C_d}{C_1+C_d}\right)}}$$

where $C_d$ is the capacitance of the diode 50.

Assuming that the diode capacitance $C_d$ is $1/15$ that of the capacitor 38*a*, the new frequency $\omega_2$ will be four times that of the original frequency $\omega_1$. The new current $I_0'$, shown in the right half portion of graph 2(*a*) is given by the following expression, $$I_0'(t)=\frac{-E_0}{\omega_2 L}\sin \omega_2(t-t_s)$$

where $t_s$ is the time at which the diode 50 stops conducting. Under the new operating conditions, the capacitor 38*a* acts as a substantially constant voltage source of magnitude approximately $-E_0$, with a small ripple or variation due to its small internal reactance, superimposed on the constant voltage, as shown in graph 2(*c*). The capacitor voltage $E_c$ drives the inductor 40*a* and the diode capacitor 64 into oscillation, the voltage $E_d$ across the diode 50 being substantially equal and opposite to the sum of the voltage $E_L$ across the inductance 40*a* and the voltage $E_c$; across the capacitor 38*a*. The maximum voltage across the diode 50 is equal to $$\frac{2E_0}{1+\frac{C_d}{C_1}}$$

It is seen that when $C_1=15C_d$, the maximum diode voltage $E_d$ is slightly less than $2E_0$, the peak voltage $E_L$ across the inductor 40*a* is $E_0$, and the voltage $E_c$ across the capacitor 38*a* is the negative of the sum of the two voltages $E_L$ and $E_d$.

The voltage $E_d$ across the diode 50 constitutes the output voltage of the delay generator 10, or the timing waveform. It is seen from graph 2(*e*) that the output pulse is delayed by a period equal at least to one half period of the first oscillation frequency $\omega_1$, the exact amount of the delay depending upon the time required for the diode voltage $E_d$ to reach a certain useful threshold voltage $E_t$, shown as a dashed line in graph 2(*e*).

It is noted that the time delay of the timing waveform 52 is determined primarily by the inductance of the inductor 40*a* and the capacitance of the capacitor 38*a*. The time required for the diode voltage $E_d$ to rise to the threshold value $E_t$ is determined by the ratio of the capacitances of the capacitor 38*a* and the diode 50. For example, if the diode capacitance $C_d$ is made smaller, the second oscillation frequency $\omega_2$ will increase, thereby producing a steeper wavefront on the timing waveform 52, and decreasing the time required to reach the threshold voltage $E_t$.

When it is desired to produce a longer time delay in the timing waveform 52, the arm 46 of the switch 42 is moved to terminal 48*b*. In this switch position, capacitor 38*b*, which has twice the capacitance value of capacitor 38*a*, is connected in series with two inductors 40*b* and 40*a* of equal inductance value. The capacitor 38*b* may be said to be individually connected to the inductors 40*a* and 40*b* collectively. Since the total inductance and the total capacitance in the circuit are each now equal to twice the previous values, it will be seen that the first oscillation frequency $\omega_1$ will be one half of the previous value, and the time delay will be twice the previous value. Similarly, when the arm 46 of the switch 42 is moved to terminal 48*c*, capacitor 38*c*, which has three times the capacitance value of capacitor 38*a*, is connected in series with three inductors 40*c*, 40*b*, and 40*a* of equal inductance value. Accordingly, the first oscillation frequency $\omega_1$ will now be reduced to one third of the original value, and the time delay will be three times the original value.

An advantage of the foregoing circuit is that the time delay of the timing waveform 52 can be changed over a wide range by simply switching into the circuit different sized capacitors and additional inductors. Since the increased inductance is provided by adding similar inductors instead of substituting a larger inductor for a smaller one, all of the inductors can be reduced to a standard, compact size.

Typical values of the voltages and circuit parameters are listed in the following table.

| | | |
|---|---|---|
| Source **20** | volts | 600 |
| Source **32** | do | —15 |
| Capacitor **26** | micromicrofarads | 100 |
| Capacitor **36** | microfarad | .001 |
| Capacitor **38***a* | micromicrofarads | 100 |
| Capacitor **38***b* | do | 200 |
| Capacitor **38***c* | do | 300 |
| Resistor **18** | megohms | 10 |
| Resistor **54** | do | 10 |
| Resistor **30** | kilohms | 100 |
| Resistor **34** | kilohm | 1 |
| Inductor **40***a* | microhenrys | 40 |
| Inductor **40***b* | do | 40 |
| Inductor **40***c* | do | 40 |

Under the conditions specified above, the time for one half cycle of the current $I_0$ at the first oscillation frequency $\omega_1$ is approximately 0.2, 0.4, 0.6 microsecond for the three different switch positions. The peak amplitude of the current $I_0$ is approximately 1 ampere.

Figure 3:
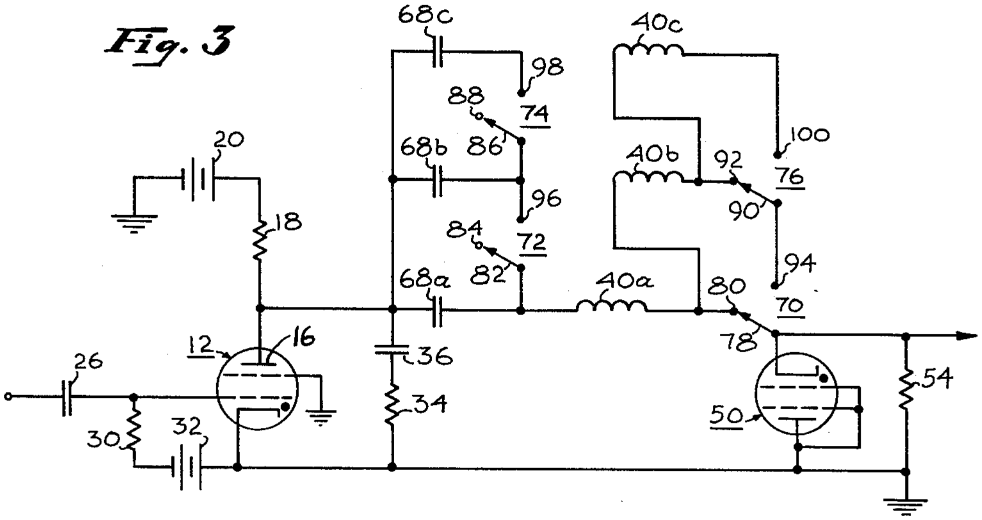
FIG. 3 is a schematic diagram of another form of delay pulse generator according to the invention.

Reference is now made to FIG. 3 for a description of another embodiment of the invention. In this embodiment, in addition to providing the inductors with equal inductance values, the capacitors that are selectively switched into the oscillatory circuit have equal capacitance values.

In FIG. 3, three capacitors 68*a*, 68*b*, 68*c* of equal capacitance value and three inductors 40*a*, 40*b*, 40*c*, of equal inductance value are selectively connected into the circuit between the anode 16 of the switching device 12 and the positive side of the diode 50 by means of four switches 70, 72, 74, 76. Assuming the inductors and capacitors are connected for the shortest period of delay, the arm 78 of switch 70 is connected to terminal 80, the arm 82 of switch 72 is connected to terminal 84, the arm 86 of switch 74 is connected to terminal 88 and the arm 90 of switch 76 is connected to terminal 92. In these switch positions, capacitor 68*a* is connected individually in series with inductor 40*a*, and all the other capacitors 68*b*, 68*c* and inductors 40*b*, 40*c* are disconnected from the circuit.

To increase the delay to twice the shortest period, the arm 78 of switch 70 is moved to terminal 94 and the arm 82 of switch 72 is moved to terminal 96. In these switch positions, two capacitors 68*a* and 68*b* are connected in parallel with each other and in series with two inductors 40*a* and 40*b*. The capacitors 68*a* and 68*b* and inductors 40*a* and 40*b* may be said to be connected together collectively, so as to double both the total capacitance and the total inductance. By doubling the capacitance and inductance, the period of the first oscillating frequency $\omega_1$, is increased to twice the original value and the delay is correspondingly increased.

To increase the delay to three times the shortest period, the arms 78 and 82 of switches 70 and 72 remain as set on terminals 94 and 96 respectively, and the arms 86 and 90 of switches 74 and 76 are moved to terminals 98 and 100, respectively. When the switches are so set, the three capacitors 68*a*, 68*b*, and 68*c* are connected in parallel with each other and in series with the three inductors 40*a*, 40*b*, and 40*c*, so as to obtain three times the total capacitance and inductance and thereby increase the delay threefold. Here again, the capacitors 68*a*–68*c* and inductors 40*a*–40*c* may be said to be connected together collectively.

Figure 4:
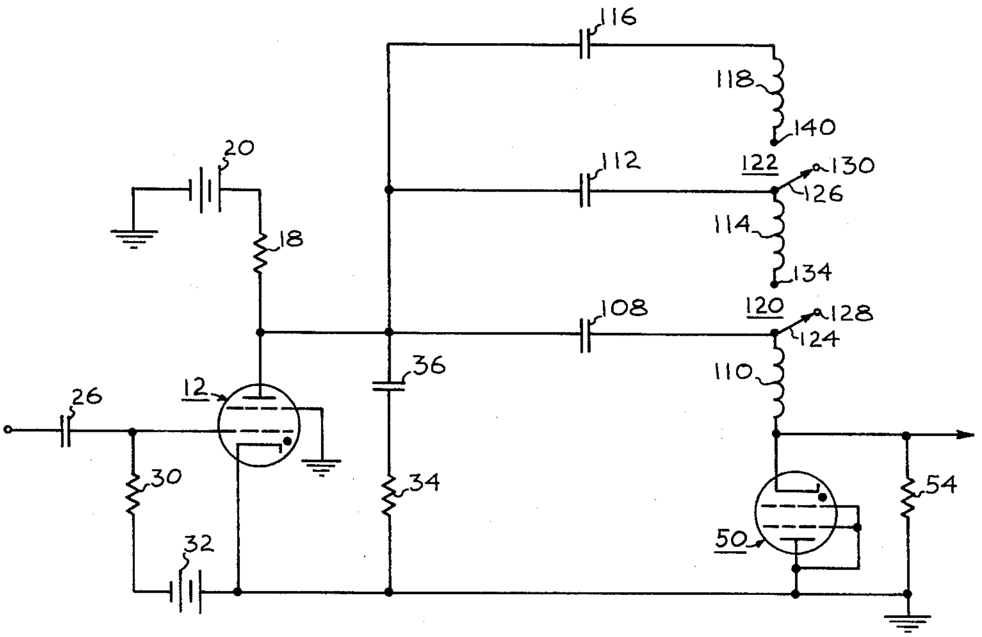
FIG. 4 is a schematic diagram of yet another form of delay pulse generator according to the invention.

FIG. 4 illustrates still another embodiment which is designed to further reduce the jitter time, especially in cases of longer periods of delay. In this embodiment, a plurality of branches are provided, each containing a capacitor and an inductor. The first branch includes capacitor 108 and inductor 110. The second branch includes capacitor 112 and inductor 114, and the third branch includes capacitor 116 and inductor 118. Switches 120 and 122 are provided for selectively adding the branches, one by one, to progressively increase the period of delay. For example, with the arms 124 and 126 of switches 120 and 122 connected in the open position to terminals 128 and 130, one capacitor 108 is connected in series with one inductor 110, and the other capacitors 112 and 116 and inductors 114 and 118 are disconnected therefrom. This connection produces the shortest delay. One half cycle of the oscillatory current is shown as curve 132 in graph 5(*a*).

To double the delay, switch 120 is closed (connected to terminal 134). Capacitor 112 and inductor 114 are thereby connected in series with each other across capacitor 108. The capacitors 108 and 112 and inductors 110 and 114 may be said to be connected together collectively. The effect is similar to adding together two sections of a lumped element transmission line. The oscillation current waveform is shown as curve 136, in graph 5(*b*)

with two current peaks corresponding to the two sections or branches of a capacitor and an inductor. The two current peaks have the effect of flattening the top of the oscillatory current waveform and of steepening the rise and fall of the current waveform as compared to a pure sinusoidal current waveform as shown in dotted curve 138. Since the termination of the desired delay is signaled by the reversal of the current flow, steepening the rise and fall of the current wave-form results in reduced jitter time.

To increase the delay time still further, the arm 126 of switch 122 is moved to terminal 140 to connect an additional branch, containing capacitor 116 and inductor 118 in series with each other, in parallel with capacitor 112. The capacitors 108, 112, 116 and inductors 110, 114, 118 may be said to be connected together collectively. The oscillatory current waveform has three current peaks, as shown in curve 142 of graph 5(*c*), with a steeper rise and fall as compared with a pure sinusoidal waveform, as in curve 144.

Instead of forming the branches of lumped elements, one may use sections of delay line, such as a coaxial cable, for example, or other resonating elements to produce the required delay. Other types of resonating elements, such as electromechanical resonators may be used.

In regard to the charging resistor 18 and D.C. return resistor 54, used in all embodiments, it is noted that they should be relatively high in resistance. The charging resistor 18, for example, should be high enough to prevent any appreciable current from being drawn by the switching device 12 from the voltage source 20. The D.C. return resistor 54 should be high enough to prevent excessive loading down of the diode 50.

It is now apparent that by means of the circuit of the invention, timing waveforms are produced with a wide range in time delays and with minimum jitter times. Furthermore, the wide range of time delays is accomplished with components of minimum and uniform size.

The embodiments of the invention in which an exclusive property or privilege is claimed are defined as follows:

1. A variable time delay generator, comprising:
a switching device;
a diode;
resonating means connected in series with said diode and said switching device and forming a circuit therewith that is selectively resonant at any one of a number of predetermined frequencies, said resonating means including a plurality of branches each containing an inductor and a capacitor in series, a first branch being permanently connected in said circuit, and
switching means for selectively connecting other ones of said branches together, with each successive branch connected in parallel with a different one of said capacitors;
a resistor in parallel with said diode;
a direct current source and a resistive means connected across said switching device and in series with said diode and said resonating means; and
a source of bias current connected to said switching device and including a capacitor and a resistor connected in series therewith and forming a current discharge path characterized by a long time constant relative to the period associated with any of said predetermined frequencies.

2. Time delay generating apparatus comprising:
a series circuit including a direct current source, a resistive member, a diode, and a resonating means, said resonating means including
a plurality of inductors and a plurality of capacitors, and
switching means for connecting said inductors and capacitors in a number of different branches, with each branch including a series connected inductor and a shunt connected capacitor, with at least one branch being permanently connected in said series circuit;
a thyratron switching tube connected in shunt with said direct current source and said resistive member;
means for sending a bias current through said thyratron switching tube and including a capacitor and a resistor connected in series across said switching tube;
said bias current means having a longer time constant relative to the period associated with any of said selected frequencies;
and a resistor connected across said diode.

3. The invention according to claim 1, wherein said inductors are of equal inductance value and said capacitors are of equal capacitance value.

References Cited in the file of this patent

UNITED STATES PATENTS 2,325,174 Cooper ---------------- July 27, 1943
2,568,319 Christensen ------------ Sept. 18, 1951
2,878,382 Creveling -------------- Mar. 17, 1959